United States Patent [19]

Rushing et al.

[11] Patent Number: 5,469,726

[45] Date of Patent: Nov. 28, 1995

[54] NUT LOCKING APPARATUS

[76] Inventors: Robert E. Rushing; Linda L. Rushing, both of 908 Elliott, Alton, Ill. 62002

[21] Appl. No.: 257,712

[22] Filed: Jun. 10, 1994

[51] Int. Cl.[6] .................................................. F16B 71/00
[52] U.S. Cl. ................. 70/232; 70/158; 70/167; 411/910; 411/429
[58] Field of Search .......................... 70/158, 163, 164, 70/166, 167–169, 178, 229, 230, 231, 232, 14, 371, 57, 58; 411/910, 429

[56] References Cited

U.S. PATENT DOCUMENTS

| | | | |
|---|---|---|---|
| 1,748,422 | 2/1930 | Lee | 70/232 |
| 1,767,643 | 6/1930 | Baird | 70/232 |
| 2,316,695 | 4/1943 | Jaffa | 70/232 |
| 2,322,347 | 6/1943 | Churchman | 70/232 |
| 3,605,460 | 9/1971 | Singer et al. | 70/232 |
| 3,696,646 | 10/1972 | Loscalzo | 70/1.5 |
| 3,732,033 | 5/1973 | Macchi | 416/244 |
| 3,748,879 | 7/1973 | Singer et al. | 70/232 |
| 3,789,635 | 2/1974 | Van Brunt et al. | 70/232 |
| 3,796,074 | 3/1974 | Vik | 70/231 |
| 4,336,698 | 6/1982 | Hurd | 70/231 |
| 5,214,945 | 6/1993 | Martin | 70/232 |

FOREIGN PATENT DOCUMENTS

| | | | |
|---|---|---|---|
| 0040667 | 12/1981 | European Pat. Off. | 70/232 |
| 31954 | 5/1926 | France | 70/14 |
| 8700098 | 8/1988 | Netherlands | 70/225 |
| 1532282 | 11/1978 | United Kingdom | 70/232 |
| 2073298 | 10/1981 | United Kingdom | 70/231 |
| 2201215 | 8/1988 | United Kingdom | 70/232 |

*Primary Examiner*—Darnell M. Boucher
*Attorney, Agent, or Firm*—Herzog, Crebs & McGhee

[57] ABSTRACT

A locking assembly for preventing access to a nut threadedly secured onto a bolt, the nut and bolt generally mounting an article, such as an outboard motor, to a structure, such as a boat transom. The locking assembly is independent of the bolt and nut, and includes a cylindrical housing that receives the bolt through one end thereof and allows for the threading of the nut onto the bolt. A cap that is received on the end of the housing opposite the bolt, by a boss and counterbore arrangement, is rotatably retained by a roll pin. The cap includes a tapered bore that receives a threaded stud and locking lug assembly. The threaded stud is received by a locking lever that is nonrotatably retained within the housing. As the locking lug is tightened, the cap is secured to the housing to prevent access to the nut.

15 Claims, 2 Drawing Sheets

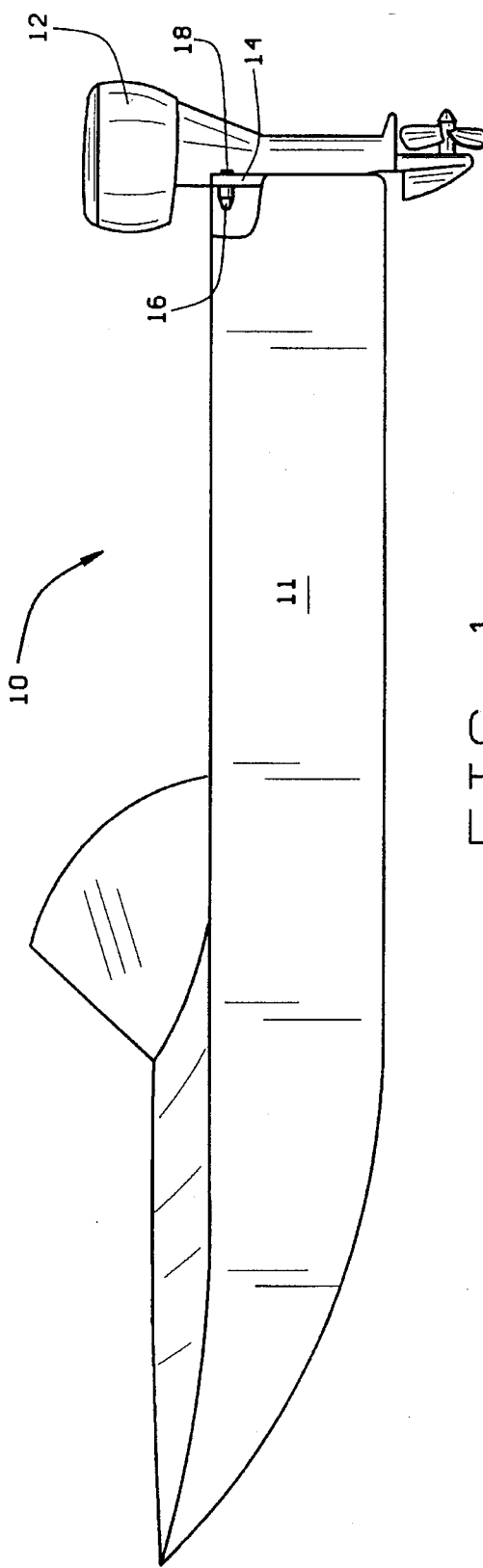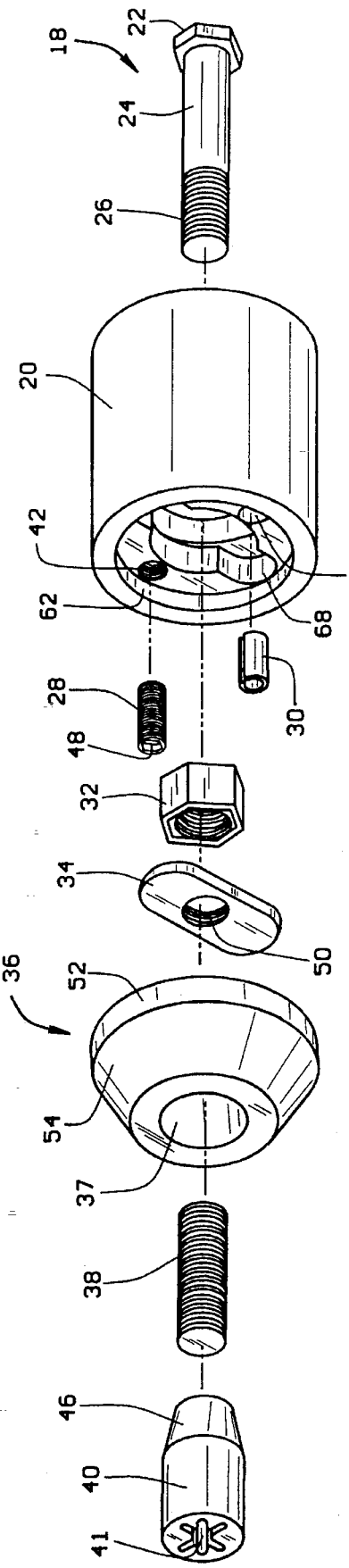

NUT LOCKING APPARATUS

BACKGROUND OF THE INVENTION

1. Field of the Invention

The present invention relates to security devices and, more specifically, to security devices for preventing access to a nut or bolt head in order to prevent theft of an article through which the bolt passes.

2. Background of the Invention

In many applications wherein a bolt and nut are used, an object is being mounted or secured to another object. Examples of these types of applications includes the mounting of wheels and spare wheels on automobiles, and the securing of an outboard motor to a transom of a boat.

In the case of an outboard motor, two bolts are typically used to secure mounting arms that depend from the motor to a boat transom. This mounting configuration leaves the head of the bolt exposed on one side, and the nut exposed on the other side. Thus, a thief with simple tools may remove the motor from the boat by merely unthreading the nut from the bolt.

There have been efforts in the past to provide systems to prevent unwanted removal of the nuts from bolts. This is evidenced by multiple patents having issued on such systems.

The present invention is directed toward a solution to the problem of preventing access to the nut of a bolt wherein the nut and bolt retains a valuable commodity.

It is thus an object of the present invention to provide a simple yet effective locking mechanism for a nut threaded onto a bolt.

It is another object of the present invention to provide a nut lock that is essentially independent of the nut and bolt.

It is still another object of the present invention to provide a nut lock for marine applications.

SUMMARY OF THE INVENTION

In accordance with the above objects, the present invention provides a locking housing for a nut that prevents unauthorized access to the nut. The nut and respective bolt are free to rotate while protected by the housing. Alternatively, the housing may rotate with respect to the nut and bolt.

In one form thereof, the present invention is a locking nut apparatus comprising a tubular housing having a bore therethrough. The shank of the bolt extends into the housing with the nut threadedly received on the bolt within the housing. A cap is nonrotatably affixed onto the end of the housing and locked thereto by a threaded stud that threads into the housing. The threaded stud includes a unique head that must be matched with the same style key in order to thread and unthread the stud.

The housing includes an annular groove with a stop. A locking lever that is received in the groove receives the stud for the cap. As the stud is threaded into the locking ring, the locking ring is rotatably held by the stop and allows the cap to be held against the housing.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and is therefore not to be considered limiting of its scope, for the invention may admit to other equally effective embodiments. Reference the appended drawings, wherein:

FIG. 1 is an elevational view of a typical boat utilizing an outboard motor and a nut enclosure in accordance with the present invention;

FIG. 2 is an enlarged, exploded view of the present nut enclosure;

DETAILED DESCRIPTION OF THE PREFERRED EMBODIMENT

Figure 3:
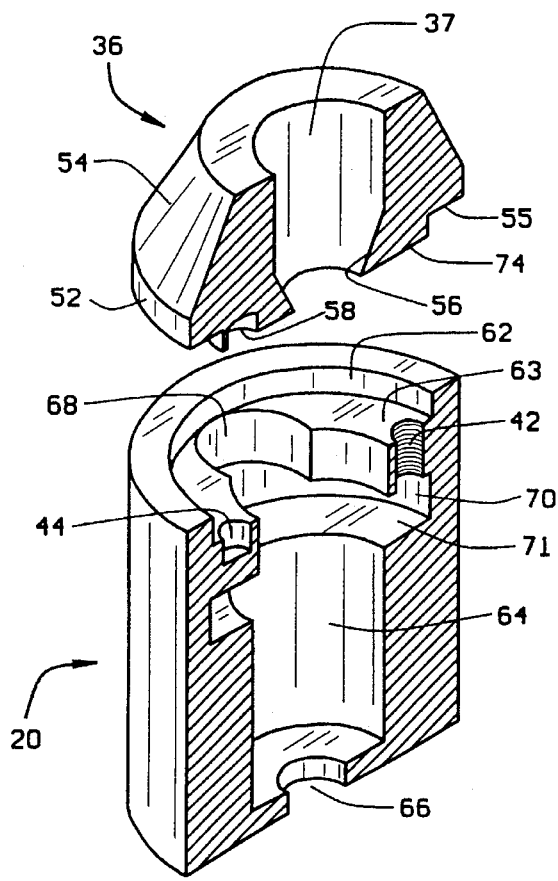
FIG. 3 is an enlarged, elevational, cross-sectional view of the housing and cap structure of the present nut enclosure.

Although the present invention was conceived for use in connection with preventing access to the nut of a outboard motor to transom retention bolt, it should be appreciated that the invention is not limited to this particular chosen application as illustrated in the accompanying drawings. Rather, the invention may be utilized whenever access to a nut needs to be restricted.

Referring now to FIG. 1, there is shown a boat generally designated 10 and otherwise known as an outboard boat. The boat 10 necessarily has a hull 11, and is known as an outboard boat because the boat 10 utilizes an outboard motor, here designated 12. The outboard motor 12 is removably mounted to the transom 14 of the hull 11 by a pair of bolts, of which only one bolt 18 is shown, that extend through mounting arms (not shown) of the outboard motor 12 and bores (not shown) in the transom 14. As depicted in FIG. 1 the nut lock apparatus 16 of the present invention, is disposed about the shank of bolt 18 and surrounds a nut that is threadedly engaged with bolt 18. Bolt 18 may be any conventional design suitable for the intended purpose.

Referring now to FIG. 2, there is shown an exploded view of the primary components of the present nut lock apparatus 16. The bolt 18 as well as the accompanying nut 32 is shown in conjunction with the nut lock apparatus 16 in order to provide an understanding of the relationship of the bolt 18 and nut 32 to the nut lock apparatus 16 and the manner of assembly. The nut lock apparatus 16 includes a cylindrical or tubular shaped main housing or member 20. The main housing 20 is preferably formed of a non-rusting metal such as aluminum. The interior structure of the housing 20 is shown in more detail in FIGS. 3–5.

Figure 4:
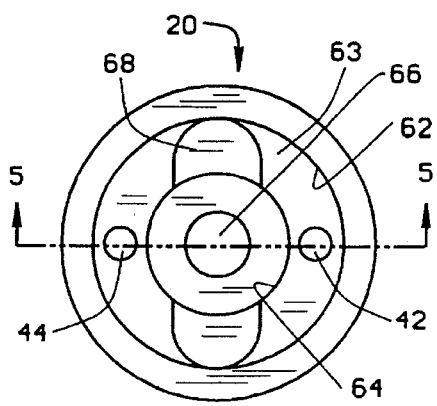
FIG. 4 is a top plan view of the housing of the present nut enclosure.
Figure 5:
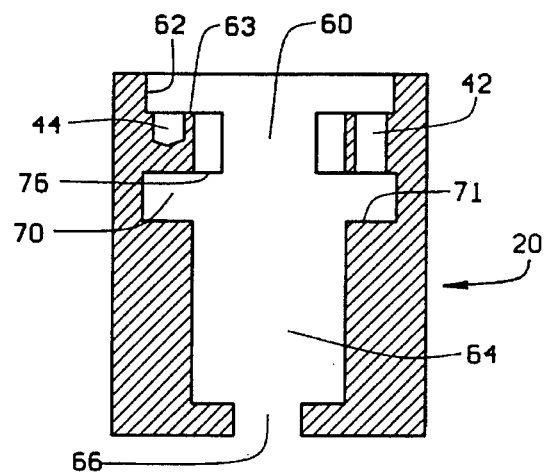
FIG. 5 is a front cross-section view of the housing of the present invention taken along line 5—5 of FIG. 4.

Referring now to FIGS. 3–5, the housing 20 has a central bore 60 that defines an interior cavity or chamber 64. Chamber 64 is sized to receive the nut 32 and be also able to accommodate a socket or wrench in order to tighten the nut 32 onto the bolt 18. At one end a bolt bore 66 permits communication with chamber 64, and is sized to allow the threaded portion 26 and the shank 24 of the bolt 18 to pass therethrough with little radial clearance. In this manner, the nut 32 cannot pass through the bolt bore 66 as the diameter of the bolt bore 66 is less than a smallest diameter of the nut 32. At the other end opposite to the bolt bore 66, the housing 20 has an annular counterbore 62 that defines an essentially ring-shaped ledge 63. Ledge 63 defines a seat for the cap 36 as more fully described below. Radially spaced from the seat 63 is an annular slot or channel 70 that defines a ring-shaped ledge 71. Ledge 71 provides a seat for a locking lever 34 when the locking lever 34 is installed therein.

Disposed in ledge 63 is a roll pin bore 44 that is adapted to receive the roll pin 30. When installed, the roll pin 30 projects a distance beyond a plane defined by the upper surface of the ledge 63. A threaded bore 42 is disposed in the ledge 63 preferably radially opposite to the roll pin bore 44. The threaded bore 42 radially extends from the upper surface of the ledge 63 to the annular channel 70. A threaded set screw 28 is threadedly received in the threaded bore 42 via an Allen head configuration 48. When installed, the set screw 28 is substantially flush with the upper surface of the ledge 63 but extends a radial distance into the annular chamber 70. As described below with reference to the operation of the present nut locking apparatus 16, the set screw 28 functions as a rotational stop for the locking lever 34.

Also disposed in the ledge 63 is a locking lever cutout or aperture 68. The aperture 68 is oblong-sized to accommodate the receipt of the locking lever 34 and allows the locking lever 34 to drop into the annular channel 70 and seat against the ledge seat 70. As best seen in FIG. 3, the locking lever aperture 68 is preferably oriented relative to the set screw bore 42 such that the locking lever 34 will rotate 90° within the annular channel 70 before positively stopped from further rotation by the set screw 28.

Referring back to FIG. 2, the nut 32 threadedly engages the threaded portion 26 of the bolt 18 within chamber 64. The nut 32 is preferably a nylock type nut. The locking lever 34 is an oblong plate preferably made of steel and having a central, threaded bore 50 that is adapted to received am end of the threaded stud 38 when the locking lever 34 is placed inside the housing 20 as described below. A cap 36, also preferably made of aluminum, is received on an end of the housing 20. The cap 36 includes a central bore 37 through which the threaded stud 38 extends when the nut locking apparatus 16 is assembled. On the other end, the threaded stud 38 threadedly engages a locking lug 40 of the kind having a special key pattern 41 on one end thereof. The locking lug 40 may be a typical lug nut type lug for securing car wheel rims to the rotor. The locking lug 40 includes a tapered or frusto-conical portion 46 at the end where the threaded stud 38 engages the locking lug 40. A special key (not shown) must be utilized to thread and unthread the locking lug 40 and threaded stud 38 during assembly and disassembly of the present nut locking apparatus 16.

Figure 6:
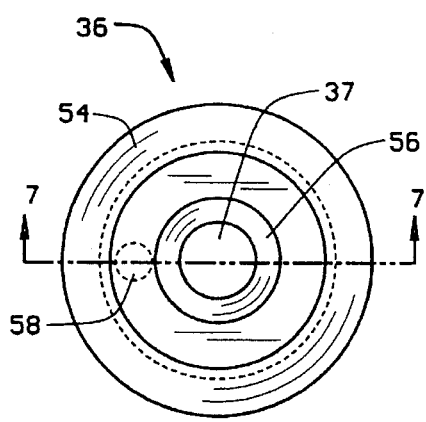
FIG. 6 is a top plan view of the cap of the present nut enclosure.
Figure 7:
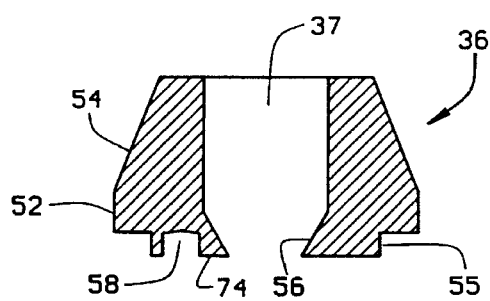
FIG. 7 is a front cross-section view of the cap of the present invention taken along line 7—7 of FIG. 6.

Referring now to FIGS. 3, and 6–7, the cap 36 is shown in greater detail. The cap 36 includes a generally frusto-conical outer contoured body 54 with an annular rim 52. The outside diameter annular rim 52 is the same as the outside diameter of the housing 20 such that when the cap 36 is fitted onto the housing 20, the outer circumference of the rim 52 is flush with the outer circumference of the housing 20. On the end adjacent the rim 52, the cap 26 includes a ring-shaped boss 55 that is adapted to fit into the counterbore 62 such that the lower surface 74 of the boss 55 abuts the ledge 63. The boss 55 includes a roll pin bore 58 that is adapted to received the protruding roll pin 30 so as to keep the cap 36 nonrotatable when the cap 36 is installed on the housing 20.

As best seen in FIG. 7, the cap bore 37 includes a radially inward taper 56 adjacent the boss 55. The slope of the taper 56 is essentially the same slope as the tapered or frusto-conical portion 46 of the locking lug 40. The mating tapers allow the locking lug 40 to positively stop when being threaded through the cap 36. Furthermore, this structure allows the end 41 of the locking lug 40 to be flush with the outer surface of the cap 36 when fully installed.

Operation

The manner of operation of the present nut lock apparatus 16 will now be described. First, it should be appreciated that set screw 28 is usually already threadedly positioned in the threaded bore 42, while the roll pin 30 is likewise usually already inserted in the roll pin bore 44. The bolt 18 extends through the designated bores of the object to be mounted and the support for that object. The threaded portion 26 of the bolt 18 is received through the bolt bore 66 of the housing 20 and extends into the chamber 64. The nut 32 is then placed onto the threaded portion 26 of the shank 24 of the bolt 18 and tightened a desired amount. When the nut 32 is tightened onto the bolt 18 the housing 20 should still be able to rotate relative to the bolt 18 and vice versa.

With the nut 32 secured to the bolt 18, the locking lever 34 is inserted into the locking lever aperture 68 to bottom out on ledge 71 of the annular channel 70. The cap 36 is placed onto the end of the housing 20 with the roll pin bore 58 of the cap 36 aligned with the roll pin 30. Once the cap 36 is in place, the threaded stud 38 and locking lug 40 are inserted into the bore 37 of the cap 36 such that the end of the threaded stud 38 threadedly engages the threaded bore 50 of the locking lever 34. As the threaded stud 38 threadedly advances, the locking lever 34 rotates until the locking lever 34 abuts the set screw 28 such that the locking lever 34 is prevented from further rotation. Also, the annular channel 70 prevents the locking lever 34 from being upwardly drawn as the locking lever 34 abuts the upper surface 76 of the annular channel 70. In this manner, the cap 36 is drawn onto the housing 20.

As stated above, the locking lug 40 is adapted to be twisted with a special key whose pattern inversely matches the pattern or key 41 of the locking lug 40. There are many varieties of keys for locking lugs and thus any type may be used.

When it is desired to remove the nut from the bolt, the cap 36 must be taken off of the housing 20. The key is used to unthread the threaded stud 38 from the locking lever 34. Counterrotation of the lug 40 and threaded stud 38 causes the locking lever 34 to rotate away from the stop (set screw 28) such that the other end of the locking lever 34 abuts the stop 28. This prevents the locking lever 34 from spinning about the annular channel 70. Once the cap 36 is removed, the locking lever 34 is removed from the housing 20. The nut 32 is now exposed within the housing and thus may be removed with an appropriate socket or wrench.

While the foregoing is directed to the preferred embodiment of the present invention, other and further embodiments of the invention may be devised without departing from the basic scope thereof, and the scope thereof is determined by the claims which follow.

What is claimed is:

1. A lock assembly for preventing access to a nut threadably secured onto a bolt, the locking assembly comprising:

a cylindrical body having a first end and a second end;

a chamber within said body, said chamber sized to receive the nut and allow tightening of the nut onto the bolt;

a bolt aperture in said first end, said bolt aperture in communication with said chamber, said bolt aperture having a diameter less than a smallest diameter of the nut;

a counterbore in said second end, said counterbore in communication with said chamber and defining a seating surface;

an annular channel disposed between said counterbore and said chamber, said annular channel coaxial with said counterbore;

a lever disposed in said annular channel and limitedly rotatable therein, said lever having a threaded bore;

a cap having a bore therethrough and a boss on one end, said boss adapted to be received in said counterbore; and a lug having a threaded stud on a first end and adapted to be received through said bore, said threaded stud received in said threaded lever bore whereby a tightening of said lug causes said cap to be secured onto said body sealing said chamber.

2. The locking assembly of claim 1, wherein said bore is radially inwardly tapered at the end adjacent said boss, and said locking lug is complimentarily tapered at the end adjacent said threaded stud and adapted to engage the taper of said bore.

3. The locking assembly of claim 1, wherein said cap has a generally frusto-conical outer surface configuration.

4. The locking assembly of claim 1, wherein said body further includes a lever aperture in said seating surface and coaxial with said main bore, said lever aperture allowing said lever to be inserted therethrough and to be seated in said annular channel.

5. The locking assembly of claim 1, wherein said cap and said body are fabricated from aluminum.

6. The locking assembly of claim 1, wherein said locking lug includes a unique key pattern on one end thereof for receipt of a matching key for threading and unthreading said threaded stud.

7. The locking assembly of claim 1, further comprising:

a stop on said seating surface; and a stop bore in said boss of said cap, said stop bore adapted to engage said stop to prevent rotation of said cap.

8. A locking assembly for preventing access to a nut secured onto a bolt, the locking assembly comprising:

a cylindrical housing having a first end and a second end;

a bore in said housing in communication with said first end and said second end, said bore defining a bolt bore at said first end, a counterbore at said second end, and a cavity between said first and second ends, said bolt bore adapted to receive a shank of the bolt therethrough, and having a diameter less than a diameter of the nut to prevent the nut from passing therethrough, said counterbore defining a seating surface and said cavity adapted to receive the nut and allow tightening of the nut onto the shank of the bolt;

an annular slot disposed between said seating surface and said cavity;

a stop disposed in said annular slot;

a locking lever disposed in said annular slot and rotationally limited by said stop, said locking lever having a threaded bore;

a cap having a bore therethrough and a boss on one end thereof, said boss adapted to be received in said counterbore and engage said seating surface; and a threaded stud having a keyed lug on one end, said threaded stud adapted to extend through said cap bore and be threadedly received in said locking lever threaded bore.

9. The locking assembly of claim 8, further comprising:

a first roll pin bore in said seating surface;

a second roll pin bore in said boss; and a roll pin disposed in said first roll pin bore and projecting beyond a plane defined by said seating surface, said roll pin adapted to engage said second roll pin bore to prevent rotation of said cap.

10. The locking assembly of claim 8, wherein said cap has a frusto-conical outer surface.

11. A lock assembly for preventing access to a nut threadably secured onto a bolt, the locking assembly comprising:

a cylindrical body having a first end and a second end;

a chamber within said body, said chamber sized to receive the nut and allow tightening of the nut onto the bolt;

a bolt aperture in said first end, said bolt aperture in communication with said chamber and having a maximum diameter less than a smallest diameter of the nut;

a counterbore in said second end, said counterbore in communication with said chamber and defining a seating surface;

a radial groove disposed on an inside surface of said body between said counterbore and said chamber;

a plate disposed in said groove and having a threaded bore;

a cap having a bore therethrough and a boss on one end, said boss adapted to be received in said counterbore; and a lug having a threaded stud on a first end and adapted to be received through said cap bore, said threaded stud adapted to be received in said threaded bore of said plate, whereby rotation of said lug causes said threaded stud to axially displace towards said first end through said threaded bore of said plate to axially displace said cap towards said first end to abuttingly secure said cap onto said body while still freely rotatable relative to said body to seal said chamber.

12. The locking assembly of claim 11, wherein said cap bore is radially inwardly tapered at the end adjacent said boss, and said locking lug is complimentarily tapered at the end adjacent said threaded stud and adapted to engage the taper of said cap bore.

13. The locking assembly of claim 11, wherein said cap has a frusto-conical outer surface.

14. The locking assembly of claim 11, wherein said cap and said body are fabricated from aluminum.

15. The locking assembly of claim 11, further comprising: a stop in said groove to prevent rotation of said plate.

* * * * *